Patented June 11, 1946

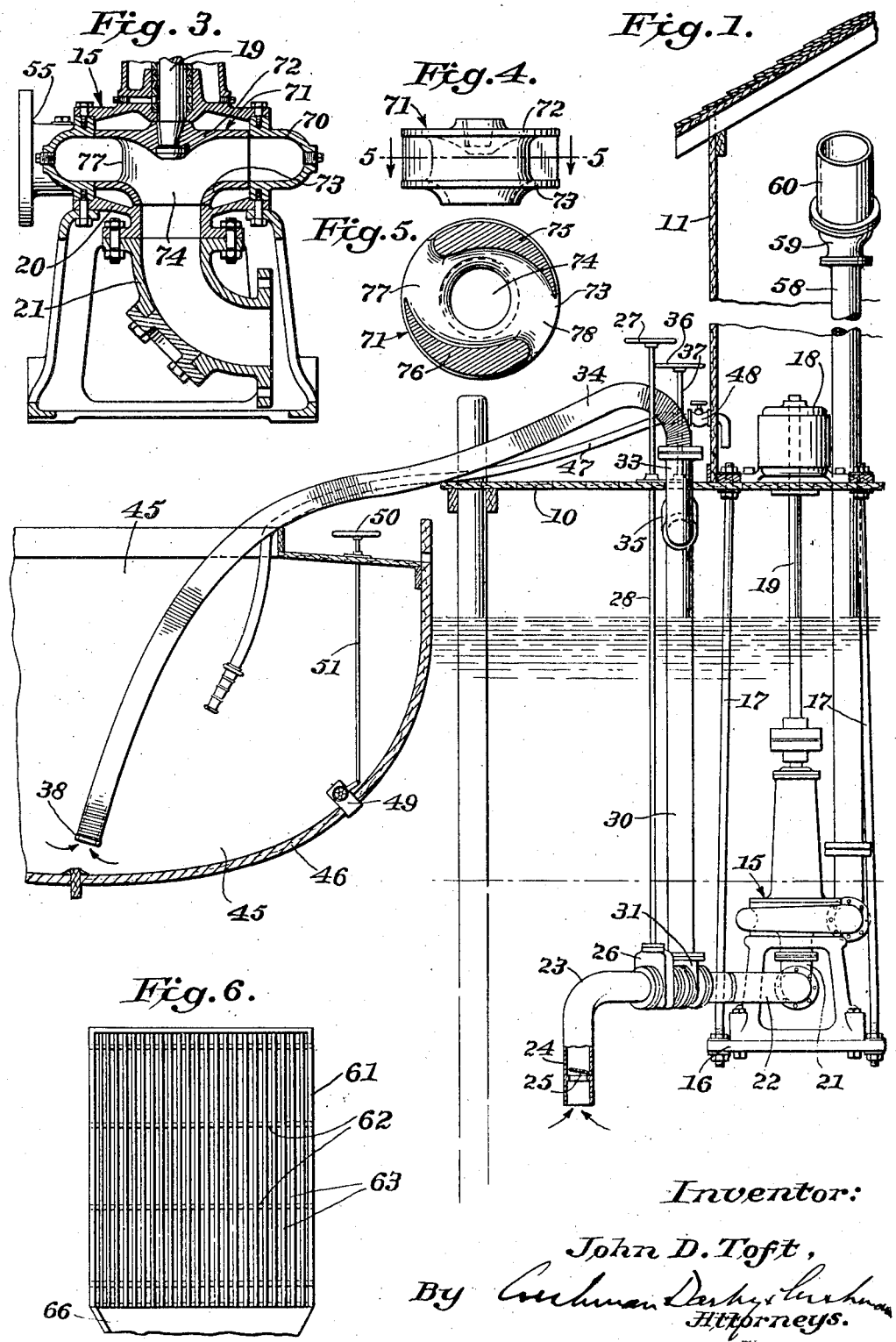
June 11, 1946. J. D. TOFT 2,402,099
APPARATUS FOR SCREENING FISH FROM A STREAM OF WATER
Filed Aug. 21, 1945 2 Sheets-Sheet 1

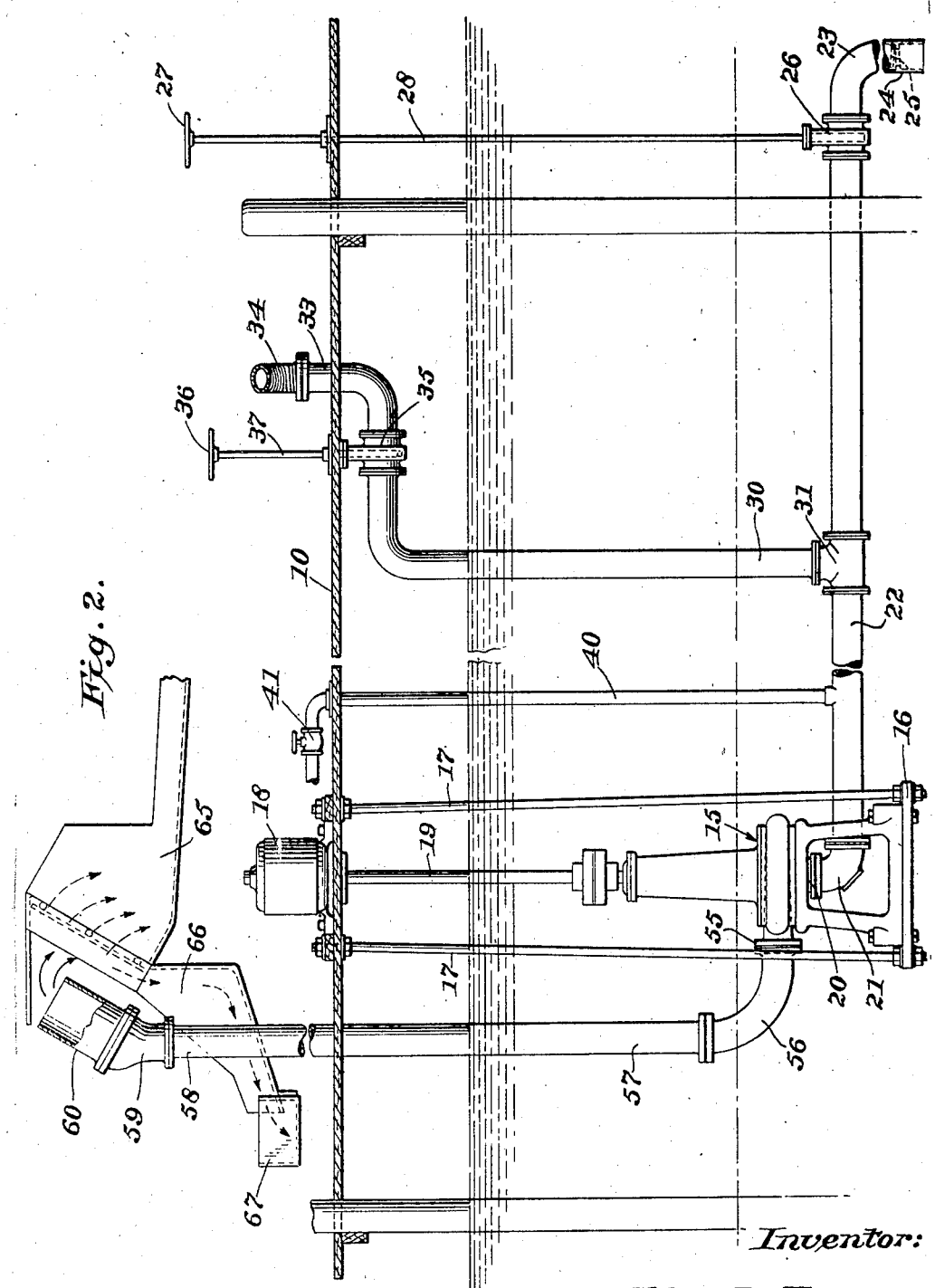

2,402,099

UNITED STATES PATENT OFFICE 2,402,099

APPARATUS FOR SCREENING FISH FROM STREAMS OF WATER

John D. Toft, South Portland, Maine

Original application October 7, 1943, Serial No. 505,397. Divided and this application August 21, 1945, Serial No. 611,800

3 Claims. (Cl. 210—149)

This application is a division of my prior application Serial No. 505,397, filed October 7, 1943 (now Patent No. 2,396,305, dated March 12, 1946), and is directed to the novel fish and water separating screen and associated elements which play an important part in the hydraulic fish unloading apparatus and in the removal of the scales from the fish, unloaded from a vessel by the apparatus claimed in that application.

The primary object of the invention of the present application is to provide an apparatus for separating fish from a flowing stream of water, and which also removes the scales from fish, such as herring, at a cannery, prior to the usual processing operations, and simultaneously with the unloading of the fish from the vessel which brings them to the cannery from the fishing areas. A further object of the invention is to provide means for separating the fish, without injury or damage to their bodies, from a stream of water of large volume, in which the fish are flowing, and by which they are conveyed from the vessel to a point of discharge in the cannery.

Another object is to provide a fish and water separating screen having improved structural characteristics which enable it to handle fish effectively and without damage.

A further object is to provide a screen over which the fish may slide without damage while large volumes of water flow over their surfaces and through the screen, to separate the fish from the stream and to wash the scales from their bodies and to remove them to a point of disposal.

Other and further objects and advantages of the invention will be apparent from a consideration of my parent application above identified, and from a consideration of the illustrative embodiment of the invention shown somewhat diagrammatically in the accompanying drawings and described below.

In the drawings,

Figure 1 is an end elevation, partly in section, showing, somewhat diagrammatically, an apparatus in accordance with the invention.

Figure 2 is a similar side elevation, taken from the left of Figure 1.

Figure 3 is a vertical section of a suitable pump which may be employed in the combination of the invention.

Figures 4 and 5 are, respectively, a side elevation and a sectional plan of the impeller used in this type of pump, and Figure 6 is an elevation of a suitable screen for separating the fish and water.

The apparatus of the invention is shown in the accompanying drawings in association with a dock 10 of a fish cannery or other building, a portion of which is indicated at 11. The manner in which the various parts are positioned with respect to the dock and cannery building is purely diagrammatic, and the invention is, in no sense, limited to the arrangement shown.

A relatively large capacity, low pressure centrifugal pump 15 may be supported upon a platform 16, suspended by supporting means 17 from the dock 10, or upon a platform supported by the floor of the sea. Preferably, the pump is positioned below the water level at normal low tide, the water level being indicated by the dot and dash lines in Figures 1 and 2. The pump may be driven by an electric motor 18 through a shaft 19 or by any equivalent means. The pump inlet 20 is connected through an elbow 21 to a horizontally extending conduit 22 of relatively large size, such as a 10 or 12 inch pipe. This conduit terminates at its remote end 23 in a downturned section 24, having an upwardly opening check valve 25 therein. An adjustable gate valve 26, positioned behind the check valve may be controlled by a vertically extending, rotatable shaft 28 having a hand wheel 27 on its upper end. Since such valves are well known in the art, it is unnecessary to describe their details of construction, and the representation thereof in the accompanying drawings is purely diagrammatic.

Between the valve 26 and the pump 15, and at a point spaced a substantial distance from the pump, there is a branch conduit 30, connected to the conduit 22 by a T-joint 31. A standpipe 33, connected to the upper end of the branch pipe 30 and supported in any suitable manner upon the dock 10, carries one end of a large flexible suction hose 34. Preferably, the pipe 30 and the hose 34 are of smaller diameter than the pipe 22, for instance, in the neighborhood of 8 or 10 inches, respectively, if a 10 or 12 inch pipe is at 22 used on the inlet side of the pump.

At some suitable point in the conduit 30 between the standpipe 33 and the pipe 22, there is an adjustable gate valve 35, adapted to be controlled by a hand wheel 36, through a rotatable shaft 37 or the like.

A second branch pipe 40 of relatively small diameter leading from a source of water under pressure may be connected to the pipe 22 and controlled by a valve 41 for the introduction of water into the system to prime the pump 15 at the commencement of an operation, if priming is necessary.

The flexible suction pipe 34 is of substantial length and, as shown in Figure 1, its free end 38 is adapted to be lowered into the hold 45 of a fishing vessel 46, tied to the dock 10.

Means are provided for adding substantial volumes of water to the fish in the hold of the vessel. For this purpose, one or more hoses 47, connected to a source of water under pressure by a valve 48 may be employed, or a seacock 49 in the hull of the vessel may be used, the latter being controlled by any appropriate means, such as a hand wheel 50 and a shaft 51.

The discharge 55 of the pump 15 is connected through an elbow 56 to a vertically extending pipe 57 of such length that its upper end 58 is preferably located on the second story of the packing house or cannery 11. At this point, means for separating the fish from the water are provided. Since the volume of water and fish delivered by the pump 15 is quite substantial, the velocity of the upwardly flowing stream in the pipe 57 is high, and it has been found to be of vital importance to reduce the speed of movement of fish before they are discharged upon the separating means, in order to prevent mutilation of the fish. In the embodiment illustrated in the accompanying drawings, the pipe 57 at its upper end supports an angularly disposed pipe section 60 of enlarged diameter, such as 12 or 14 inches, if the pipe 57 is of 10 or 12 inch diameter. When the stream of water and fish enter this enlarged terminal section, their velocity is reduced to the desired extent, and they flow quite gently upon the separating means positioned adjacent thereto.

The screen which serves to separate the fish from the flowing stream of water preferably comprises a frame 61 of rectangular form supported in a rearwardly inclined position, facing the discharge pipe. A plurality of horizontal bars 62, spaced a substantial distance apart and secured at their ends in the frame 61, carry a great plurality of relatively small rods 63, welded to the front face thereof, in closely spaced relation and disposed in vertical planes. In the preferred embodiment of the invention, the rods or bars 63 are smooth, round welding electrode rods of substantially three-sixteenths inch diameter, spaced apart a distance of substantially three-sixteenths of an inch. Rods of this type are admirably suited for the screen, since they have sufficient strength, present a smooth surface to the fish, are not corroded by sea water, and may be easily welded to the supporting bars.

It has been found that conventional screens are entirely unsuited for the work involved in separating fish from a flowing stream of sea water, since the rough surfaces of reticulated or expanded metal screens damage the fish thrown against them, and small fish and foreign bodies in the stream tend to clog the openings thereof. With a screen of the type described herein, however, the elongated slots of narrow width permit the passage of water and discard small fish or trash, with the result that the screen is substantially completely non-clogging. Moreover, the smooth, vertically extending, parallel bars present an ideal sliding surface for the fish thrown thereagainst by the streams of water.

Behind the screen there is positioned a sluiceway or chute 65 for the water which passes through the screen, to convey the water to a point of discharge, such as the end of the dock. In front of the screen means are provided for conveying the fish to storage or to a processing station. Although any form of conveyor may be used, a sluiceway 66 has been found satisfactory. The fish and the water which does not pass through the screen flow downwardly through the sluiceway 66 to a transversely arranged chute or trough 67 which may extend along and above a plurality of storage tanks, into which the fish may be selectively discharged by the use of suitable gates and the like.

The use of a pump of the type shown in Figures 3, 4 and 5, is of considerable importance in the present invention, since such a pump is effective to convey the fish without mutilating or damaging them as they pass through the impeller chamber. Although pumps of this type are well known, their structure will be briefly described, since their use in the combination disclosed herein is thought to be entirely novel. The pump comprises a large volute casing 70, having an inlet 20, connected as previously described to an elbow 21 or the like. Within the casing is an impeller 71 having an upper imperforate head 72 connected to the motor shaft 19 and a lower head 73 having a large opening 74 therein aligned with the inlet 20. The heads are interconnected by and are cast integrally with vanes 75, 76, having large, relatively unrestricted discharge passages 77, 78 therebetween. It will be noted that the leading ends of the vanes are smooth, rounded and blunt, and that the trailing ends are rearwardly inclined and taper to a thin edge. It will be appreciated that there are substantially no surfaces which can mutilate the fish, since the fish flow axially into the impeller between the blades and laterally through the spaces 77, 78, into the large volute casing 70, from which they are conveyed by the flowing stream through the pipe 57.

It is thought that the operation of the apparatus of the present invention and the method of unloading fish from a vessel will be apparent from a consideration of the foregoing description. For the sake of clarity, however, the procedure will be briefly outlined.

When a vessel with a cargo of fish, such as herring, has arrived at the dock, the pump 15 is started, with the valve 26 open and the valve 35 closed. If necessary, the pump and the pipe 22 are filled with water for priming purposes by opening the valve 41. If the pump and the pipe 22 are submerged in the sea water, as preferred, priming is unnecessary, since the system is normally filled with water, but at extremely low tides or because of other low water conditions, it is sometimes necessary to prime the pump. Of course, when priming has been completed, the valve 41 is closed.

With the valves 26 and 35 positioned as described above, a solid stream of water will flow through the check valve 25, the conduit 22, the pump 15 and the discharge pipe 57. Before the valves are readjusted, a substantial volume of water is introduced into the fish in the hold of the ship, either by opening the seacock 49 or by the use of the hoses 47 or both. The hose 47 may be a conventional fire hose, equipped with a suitable nozzle to assist in washing down the fish from the sides and corners of the hold to the suction pipe, particularly during the last stages of the unloading operation.

When a sufficient body of water has been added to substantially immerse the fish and to displace any air that might otherwise be present in the spaces between the fish, the valve 35 is gradually opened and the valve 26 gradually partially closed. This results in a suction in the line 30 and the suction hose 34, with the result that the fish and the water in which they are immersed start to flow through the hose 34 and the pipe 30 to the T connection 31, at which point the fish join the stream of water flowing through the pipe 22 to the pump 15. The valves are further adjusted, to increase the rate of flow of the fish, while continuing the introduction of additional water into the stream through the conduit 22 under the control of valve 26. By properly adjusting these valves, as the operation continues, an extremely accurate proportioning or blending of fish and water flowing through the pipe may be effected, to the end that the fish are dispersed to the desired degree in the stream of water acting as a carrier. This dispersion of the fish in the water is important in preventing damage to the fish as they flow through the pipes and the pump. If the fish were closely packed in the flowing stream, they would force each other into contact with the pipe walls and into engagement with the impeller blades and the pump casing walls. By providing a relatively large body of free water around the fish, the fish are able to flow freely through the passageways, substantially out of contact with the metallic surfaces thereof. Thus, the proportioning of the water and fish in the flowing stream is of paramount importance in practicing the method of the present invention.

Although a pump of the type described above is substantially non-clogging, a concentrated stream of fish introduced into such a pump, would cause damage to the fish by the impeller, but when they are dispersed in a stream of water, to a controlled degree, in accordance with the present invention, they pass freely through the pump, without damage.

The fish in the stream of water flow upwardly through the pipe 57 from the volute casing of the pump, under the hydrostatic head produced by the centrifugal forces set up by the impeller. The flow of the stream is sufficiently rapid to maintain the fish in the desired dispersed condition. At the upper end of the discharge pipe, the stream enters the enlarged section 60, where its speed of movement is very substantially reduced so that, when the fish and water are discharged against the bars 63 of the screen, the fish are not damaged. From this point, the fish flow through the sluiceways, preferably to storage tanks containing a highly concentrated solution of refrigerated brine. From these tanks the fish may be transferred as desired to the usual flaking tanks.

It has been found in actual practice, with the use of the apparatus of the present invention, that the fish moving through the conduits in dispersed condition in large volumes of water, and through the pump, and then separated from the stream by the screen 63 lose substantially all of their scales, without damage to the fish. The fish slide down the screen relatively slowly, as the large volumes of water flow over their surfaces and through the spaces between the bars 63. The force of the flowing stream holds the fish against the bars with considerable force, but, because of the smooth, rounded surfaces of the bars, the fish are not damaged. The soaking and agitation of the fish in the water in the conduits, prior to their delivery to the screen tend to loosen the scales and to remove some of them from the skin of the fish. When the fish are discharged against the screen and their movement thus arrested, the water of the stream, pouring over their surfaces removes substantially all of the scales and carries them through the slots between bars 63. The scales of such fish as herring are small and are not particularly firmly attached, so that the soaking of the fish and the flowing and agitation of the fish in large volumes of water through the conduits, through the pump and against the screen tend to dislodge the scales, which scales flow with the stream through the screen, for disposal. The scales are so small that they readily pass through the slots, leaving the fish in substantially completely scaled condition, to slide down the sluiceway and chutes to the brine tanks. The fish are transferred from the refrigerated brine in these tanks to the usual flaking tanks, where any scales not previously removed are deposited.

As illustrating the usual and unexpected fish scaling abilities of the apparatus of the present invention, it may be pointed out that, with conventional methods of unloading fish by hoists and the like, the flaking tanks collect two feet or more of scales in a predetermined time, while the same tanks collect less than two inches of scales in the same length of time, when the hydraulic fish handling system of the present invention is employed. This probably results from the fact that, with the old methods, the fish were handled in batches, with substantially no agitation in large volumes of water so that the scales were not soaked and removed prior to their delivery to the flaking tanks.

Although the invention has been described with considerable particularity, by reference to the embodiment shown in the drawings, it must be understood that it is not limited to the details of construction shown and described, but covers all modifications coming within the scope of the appended claims and their equivalents.

I claim:

1. An apparatus for screening fish from a flowing stream of water, comprising a screen inclined from a vertical plane and having a front face consisting of a plurality of straight, spaced parallel bars inclined upwardly and rearwardly from the lower to the upper edge of the screen, and a conduit for delivering the fish and water to the screen, said conduit terminating in an open discharge end adjacent to, spaced from and located in front of the screen and arranged to discharge the stream and the fish upwardly in substantially the same inclined direction as the screen, whereby the stream passes through the screen and the fish slide down along said bars without mutilation.

2. An apparatus for screening fish from a flowing stream of water, comprising a screen inclined from a vertical plane and having a front face consisting of a plurality of straight, spaced parallel bars inclined upwardly and rearwardly from the lower to the upper edge of the screen, and a conduit for delivering the fish and water to the screen, said conduit having a terminal portion substantially parallel to the screen and having an open discharge end adjacent to, spaced from and located in front of the screen and arranged to discharge the stream and the fish upwardly in a direction substantially parallel to the screen, whereby the stream passes through the screen under the influence of gravity and the fish slide down along said bars without mutilation.

3. An apparatus for screening fish from a flowing stream of water, comprising a screen inclined from a vertical plane and having a front face consisting of a plurality of straight, spaced parallel bars inclined upwardly and rearwardly from the lower to the upper edge of the screen, a conduit for delivering the fish and water to the screen, said conduit terminating in an open discharge end adjacent to, spaced from and located in front of the screen and arranged to discharge the stream and the fish upwardly in substantially the same inclined direction as the screen, whereby the stream passes through the screen and the fish slide down along said bars without mutilation, means behind the screen for collecting the water passing therethrough, a disposal conduit leading from said collecting means, and means in front of and below the screen for continuously conveying the fish to storage or the like.

JOHN D. TOFT.